US005996382A

United States Patent [19]
Lehmkuhl

[11] Patent Number: 5,996,382
[45] Date of Patent: Dec. 7, 1999

[54] AUTOMOTIVE LOCK MECHANISM USING A TORQUE CABLE DRIVE

[75] Inventor: David Bruce Lehmkuhl, Dearborn, Mich.

[73] Assignee: Ford Global Technologies, Inc., Dearborn, Mich.

[21] Appl. No.: 09/037,655

[22] Filed: Mar. 10, 1998

[51] Int. Cl.[6] .......... B60R 25/00
[52] U.S. Cl. .......... 70/256; 70/237; 292/DIG. 25
[58] Field of Search .......... 70/256, 257, 237, 70/238; 292/144, DIG. 25

[56] References Cited

U.S. PATENT DOCUMENTS

| | | | |
|---|---|---|---|
| 1,662,423 | 3/1928 | Jacobi | 70/379 R |
| 1,696,957 | 1/1929 | Jacobi | 70/256 X |
| 1,788,473 | 1/1931 | Smith | 70/256 X |
| 1,840,469 | 1/1932 | Sabo | 70/DIG. 42 X |
| 2,202,422 | 5/1940 | Hoof | 70/256 X |
| 2,637,196 | 5/1953 | Seaver et al. | 70/379 R |
| 2,796,755 | 6/1957 | Craig | 70/264 |
| 3,089,329 | 5/1963 | Kerr | 70/135 |
| 3,529,452 | 9/1970 | Rae | 70/256 X |
| 3,604,229 | 9/1971 | Wake | 70/107 |
| 3,691,799 | 9/1972 | Hoffmann et al. | 70/DIG. 42 X |
| 3,769,075 | 10/1973 | Grogan | 70/256 X |
| 4,008,588 | 2/1977 | Miller et al. | 70/419 |
| 4,073,170 | 2/1978 | Miyabayashi et al. | 70/256 |
| 4,080,812 | 3/1978 | Knott | 70/256 |
| 4,155,233 | 5/1979 | Lira | 70/DIG. 42 X |
| 4,413,493 | 11/1983 | Meinsen et al. | 70/422 |
| 4,570,467 | 2/1986 | Greco | 70/99 |
| 4,617,812 | 10/1986 | Rogers | 70/218 |
| 5,233,849 | 8/1993 | Forbers | 70/256 |
| 5,247,817 | 9/1993 | Korner et al. | 70/256 X |
| 5,544,508 | 8/1996 | Torkowski | 70/257 X |
| 5,615,564 | 4/1997 | Inoue | 70/229 |
| 5,647,234 | 7/1997 | Foster | 70/256 |

*Primary Examiner*—Suzanne Dino Barrett
*Attorney, Agent, or Firm*—Steven A. Maynard

[57] ABSTRACT

An automotive lock mechanism is disclosed having a housing with a cylindrical bore, a key cylinder rotatably received within the housing cylindrical bore, a flexible cable having first and second ends, the first end rotatably engaging the key cylinder, and a rotatable release cam receiving the second end in a rotatable, detachable relationship, the release cam adapted to operatively engage a latch mechanism.

6 Claims, 1 Drawing Sheet

AUTOMOTIVE LOCK MECHANISM USING A TORQUE CABLE DRIVE

BACKGROUND OF THE INVENTION

1. Field of the Invention

The present invention relates generally to automotive lock mechanisms. More particularly, the present invention relates to torque cable drives for such mechanisms.

2. Disclosure Information

Conventional automotive lock mechanisms generally comprise a key cylinder, levers or rods, and a latch mechanism. Typically, actuation of the key cylinder causes the levers or rods to transfer motion to the latch mechanism. This manipulation facilitates locking or unlocking of a vehicle door or trunk for example. Car thieves can break into vehicles by defeating conventional lock mechanisms in a number of ways.

One way of defeating a conventional lock mechanism is by using an elongate thin piece of metal, often with a hook at the end, sometimes referred to as a Slim Jim. By sliding the Slim Jim between the windshield and the windshield seal, the levers may be manually actuated to transfer motion to the latch mechanism, thereby bypassing having to use a key.

Another way of defeating such lock mechanisms is by translating or rotating the key cylinder with respect to the vehicle body to actuate the levers. This is done by forcing a tool, such as a screw driver, into the key cylinder and forcibly manipulating the screw driver until the key cylinder breaks free of the vehicle body. Once broken free, the key cylinder is manipulated, via the screw driver, in a translational or rotational fashion to manually actuate the levers and transfer motion to the latch mechanism.

Attempts to combat such methods of defeating a lock mechanism have taken a number of forms. One method is to include large steel shields in the door, close to the windshield and windshield seal, to prevent accessing the levers with a Slim Jim. Another method is to reinforce the attachment of the key cylinder to the vehicle door to inhibit breaking the cylinder free from the door. These methods, however, have proven to be costly and ineffective. Someone wishing to defeat such methods, for example, need only employ tools that are capable of imparting greater destructive force to the particular area.

It would therefore be desirable to provide an automotive vehicle lock mechanism, capable of defeating conventional theft methods, that overcomes the deficiencies associated with previous designs.

SUMMARY OF THE INVENTION

The present invention overcomes the disadvantages of the prior art approaches by providing an automotive lock mechanism having a housing with a cylindrical bore, a key cylinder rotatably received within the housing cylindrical bore, a flexible cable having first and second ends, the first end rotatably engaging the key cylinder, and a rotatable release cam receiving the second end in a rotatable, detachable relationship, the release cam adapted to operate in communication with a latch mechanism.

It is an object and advantage of the present invention to use a rotatable, flexible cable to actuate the latch mechanism. Manually accessing the cable, in the above described theft modes, will not actuate the present latch mechanism. More specifically, only rotation of the cable will actuate the latch, not translation, which is not possible with the described theft modes.

A feature of the present invention is the rotatable release cam receiving the second end of the flexible cable in a rotatable, detachable relationship. If the described theft modes are attempted, the flexible cable will detach from the release cam rendering the latch mechanism inoperable.

These and other advantages, features and objects of the invention will become apparent from the drawings, detailed description and claims which follow.

DETAILED DESCRIPTION OF THE PREFERRED EMBODIMENTS

Figure 1:
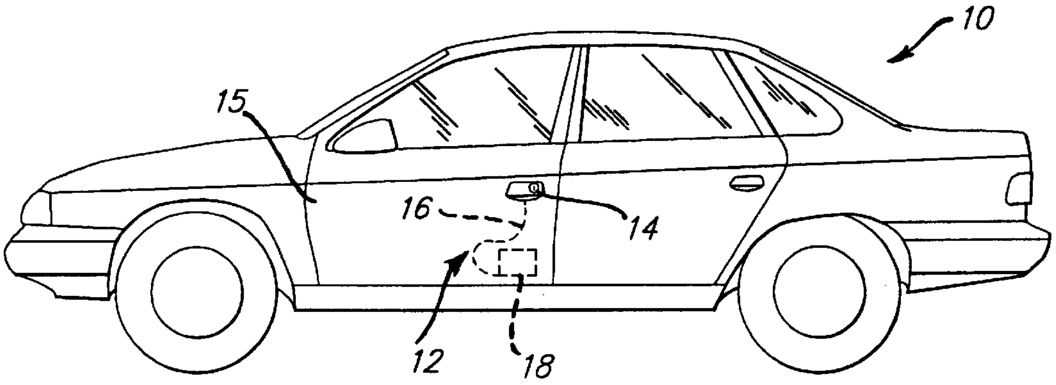
FIG. 1 is a side view of an automotive vehicle having a lock mechanism according to the present invention.

Referring now to the drawings, FIG. 1 shows an automotive vehicle 10 having a lock mechanism 12. The lock mechanism 12 has a key operated cylinder lock 14, a torque cable 16, and a latch mechanism 18. The lock mechanism 12 herein described is typically housed in a vehicle door 15. More specifically, the mechanism 12 is housed between an inner and outer door panel.

Figure 2:
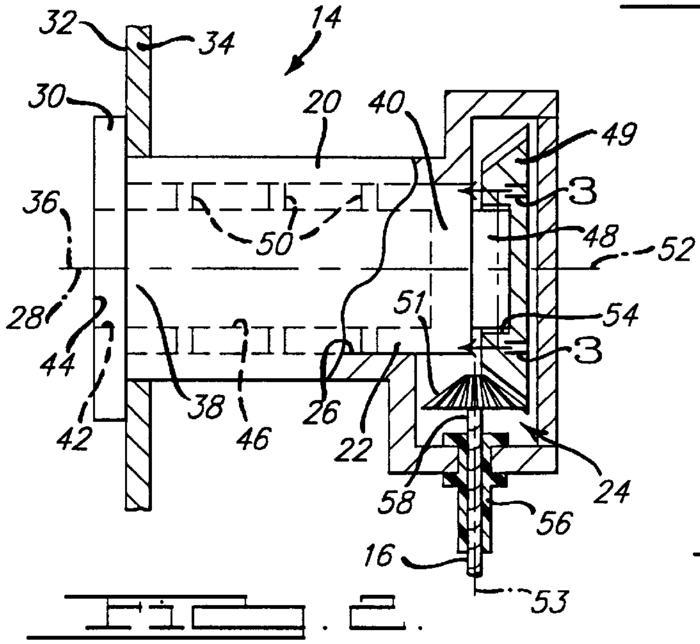
FIG. 2 is a side cutaway view of a key operated cylinder lock according to the present invention.

As shown in FIG. 2, the key operated cylinder lock 14 has a housing 20, an inner, key rotatable cylinder 22, and a gear arrangement 24. The housing 20 has a cylindrical bore 26 having a longitudinal axis 28. The housing 20 further has a lock face portion 30 mounted outwardly of an outboard side 32 exterior panel 34. The housing 20 may be mounted by being clamped or locked, not shown, to the exterior panel 34 in conventional fashion. The exterior panel 34, of the present invention, is a vehicle door but may also be a vehicle trunk without departing from the scope of the present invention.

The inner cylinder 22 has a longitudinal axis 36, a first end 38, and a second end 40. The first end 38 has a key receiving slot opening 42 through a front surface 44. A key slot 46 extends substantially the axial length, from the opening 42 to the second end 40, along with one or more resiliently urged tumblers 50. The second end 40 has a gear engaging tongue 48. The inner cylinder 22 is received in the cylindrical bore 26 to allow for coaxial, 28 and 36, rotational movement of the cylinder 22 with respect to the bore 26.

Figure 3:
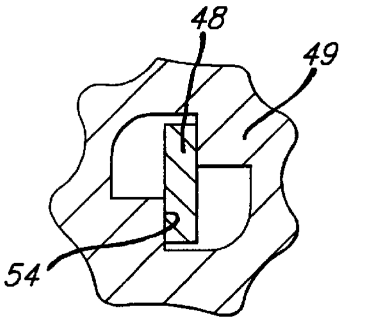
FIG. 3 is a cutaway sectional view of an inner barrel-bevel gear interface taken along the line 3—3 of FIG. 2 according to the present invention.

The gear arrangement 24 is preferably a combination of first and second bevel gears, 49 and 51 respectively. The first bevel gear 49 has an axis of rotation 52 and a tongue receiving slot 54. The slot 54 is configured as shown in FIG. 3 with a pair of opposed pie-shaped halves to permit lost motion rotation of the tongue 48 therein, as is known in the art. The gear arrangement 24 is received in the cylindrical bore 26 to allow for coaxial, 36 and 52, rotation with respect to the cylinder 22.

The torque cable 16 is preferably an elongate flexible cable, but may also be an elongate rigid rod without departing from the scope of the present invention. Further, the flexible cable or rod may have a sheath or casing 56 depending on the particular design requirements. The cable 16 has a first end 58 and a second end 60, as shown in FIGS.

Figure 5:
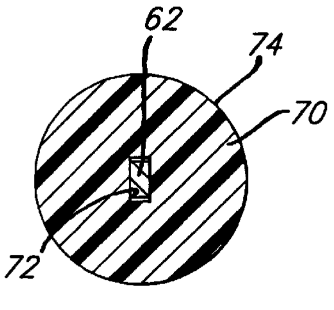
FIG. 5 is a sectional view of a release cam taken along the line 5—5 of FIG. 4 according to the present invention.

2 and 4 respectively. The first end 58 has the second bevel gear 51 rigidly connected thereto. The second end 60, distal the first end 58, has a rectangular cross section end piece 62, as most clearly shown in FIG. 5. Intermediate the first and second ends, 58 and 60 respectively, and adjacent the second end 60 are first and second sets of raised surfaces, 64 and 66 respectively. The first set of raised surfaces 64 has a predetermined height. The second raised surfaces 66, intermediate the first raised surfaces 64 and the second end 60, have a predetermined height less than the first surfaces 64. The surfaces, 64 and 66, may project from the torque cable 16 or the casing 56 depending on design requirements.

Figure 4:
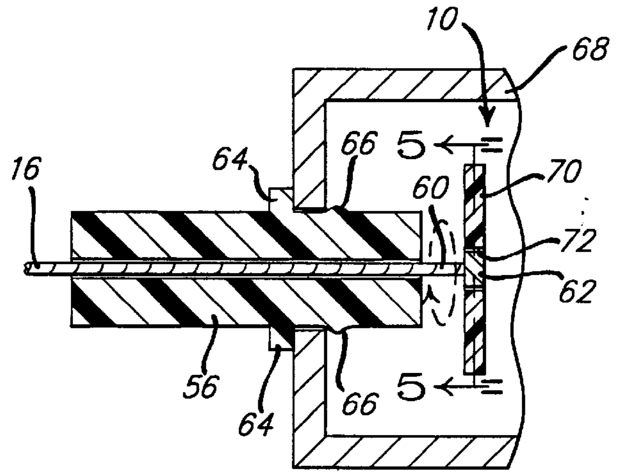
FIG. 4 is a side cutaway view of a torque cable-latch housing interface according to the present invention.

As further shown in FIG. 4, the latch mechanism 18 has a mechanism housing 68. The housing 68 is conventionally secured to an inner door panel or wall, not shown. One part of a conventional latch mechanism 18 is a rotatable release cam 70. The release cam 70, disposed within the latch housing 68, has a rectangular opening 72 therethrough. The release cam 70 is provided with a camming surface 74, which cooperates with other components of a conventional latch mechanism to perform a latching and unlatching function. Conventional latch mechanisms include elements such as a pawl, a keeper pin, and a latch hook, for example, functioning together to hold a door in a closed position. Such elements are not shown and are not considered part of the novel aspects of the present invention.

In assembly, the second bevel gear 51 of the torque cable 16 is received within the housing 20 through a side wall of the housing 20, as shown in FIG. 2. The second bevel gear 51 rotationally engages the first bevel gear 49. The rotational axis 53 of the second bevel gear 51 is substantially perpendicular to the axis of rotation 52 of the first bevel gear 49. Other perpendicular gear or drive arrangements may be employed without departing from the scope of the present invention. Further, the angular relationship between the axes of rotation, 52 and 53, of the gears, 49 and 51, is meant to be exemplary and may vary depending on the particular vehicle design requirements. As shown in FIG. 4, the latch mechanism housing 68 engages the cable 16 intermediate the first and second raised surfaces, 64 and 66 respectively. The rectangular end piece 62 is detachably received by the rectangular opening 72 of the release cam 70 in a translationally free, rotationally constrained relationship. In other words, rotational movement of the end piece 62 is constrained by the release cam 70, so that when the end piece rotates 62 the cam 70 rotates therewith. Furthermore, translational movement of the end piece 62 is free with respect to the cam 70 in that if the cable is axially translated, the end piece 62 disengages from the cam 70. The end piece 62 engaging the cam 70 in such a relationship is meant to be exemplary only. Engagement in such a fashion to other elements of various latch mechanisms, known in the art, to facilitate actuation of the latch is considered fully within the scope of the present invention.

In use, a key is inserted into the key slot 46. Turning the inner key cylinder 22 rotates the first bevel gear 49. Rotation of the first bevel gear 49 initiates rotation of the second bevel gear 51. Rotating the second bevel gear 51 causes the torque cable 16 to rotate. Rotation of the torque cable 16 causes the release cam 70 to rotate via the end piece 62 thereby actuating the latch mechanism 12.

The present invention is advantageous for a number of reasons. First, manually translating the key housing 20 with respect to the vehicle body, by breaking the housing 20 free from the vehicle body with a screwdriver for example, will not affect actuating the release cam 70. Actuating the release cam 70 is possible only by rotating the torque cable 16. Second, if the torque cable 16 is axially translated, by a Slim Jim for example, the cable 16 will detach from the release cam 70 thereby preventing actuation of the latch mechanism 18. Third, the first and second raised surfaces, 64 and 66 respectively, serve a dual function. The surfaces, 64 and 66, first function to hold the cable 16 in place with respect to the housing 68 and second to facilitate disengaging the end piece 62 from the cam 70. More specifically, the second raised surfaces 66 are of a predetermined height sufficiently adapted to allow the cable 16 to be pulled free from the housing 68 upon application of a predetermined axial force.

Various other modifications to the present invention will, no doubt, occur to those skilled in the art to which the present invention pertains. It is the following claims, including all equivalents, which define the scope of the present invention.

What is claimed is:

1. An automotive lock mechanism comprising:

a housing having a cylindrical bore;

a key cylinder rotatably received by the cylindrical bore;

a flexible torque cable having first and second ends, the first end rotatably engaging the key cylinder;

a rotatable release cam operatively connected to a latch mechanism; and release means for releasably interconnecting the second end of the flexible torque cable to the rotatable release cam, said release means being operative to allow rotation of the flexible torque cable under normal operation to rotatably drive the rotatable release cam and further being operative to allow detachment of the second end of the flexible torque cable from the rotatable release cam by axial translation thereof, thereby preventing the rotatable release cam from operating the latch mechanism.

2. A lock mechanism according to claim 1, wherein the lock mechanism further comprises:

a first bevel gear, disposed within the housing, engaging the key cylinder; and a second bevel gear, disposed within the housing, engaging the first end of the flexible cable and the first bevel gear, so that rotating the key cylinder rotates the first bevel gear thereby rotating the second bevel gear which rotates the flexible cable thereby actuating the release cam.

3. A lock mechanism according to claim 2, wherein the axis of rotation of the first bevel gear is substantially perpendicular to the axis of rotation of the second bevel gear.

4. A lock mechanism according to claim 1, wherein the release means comprises a rectangular aperture disposed through the release cam that receives the second end of the flexible cable having a rectangular cross section, so that when the flexible cable is rotated the release cam is rotated and when the flexible cable is axially translated the rectangular second end is withdrawn from the rectangular aperture.

5. A lock mechanism according to claim 1, wherein the flexible cable is received by a latch housing, the flexible cable further having raised portions adjacent an inner and outer latch housing wall, the raised portions adapted to maintain the flexible cable in a predetermined position with respect to the latch housing and to release the flexible cable from the latch housing upon axial translation of the flexible cable.

6. A lock mechanism according to claim 5, wherein the raised portions adjacent the inner wall have a height a predetermined degree less than the height of the raised portions adjacent the outer wall.

* * * * *